United States Patent
Andersson et al.

(10) Patent No.: US 10,414,402 B2
(45) Date of Patent: Sep. 17, 2019

(54) METHOD FOR CONTROLLING GEAR SHIFTING OF A WORKING MACHINE

(71) Applicant: VOLVO CONSTRUCTION EQUIPMENT AB, Eskilstuna (SE)

(72) Inventors: Thomas Andersson, Eskilstuna (SE); Mats Åkerblom, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 193 days.

(21) Appl. No.: 15/557,138

(22) PCT Filed: Mar. 25, 2015

(86) PCT No.: PCT/SE2015/050358
§ 371 (c)(1),
(2) Date: Sep. 11, 2017

(87) PCT Pub. No.: WO2016/153403
PCT Pub. Date: Sep. 29, 2016

(65) Prior Publication Data
US 2018/0043898 A1    Feb. 15, 2018

(51) Int. Cl.
*B60W 30/18* (2012.01)
*B60W 10/04* (2006.01)
(Continued)

(52) U.S. Cl.
CPC ..... *B60W 30/18172* (2013.01); *B60K 7/0007* (2013.01); *B60K 23/0808* (2013.01);
(Continued)

(58) Field of Classification Search
CPC ........... B60W 30/18172; B60W 10/08; B60W 30/19; B60W 10/10; B60W 2510/083;
(Continued)

(56) References Cited

U.S. PATENT DOCUMENTS 4,947,332 A    8/1990    Ghoneim
9,458,603 B2 *  10/2016   Enomoto .............. E02F 9/2079
(Continued)

FOREIGN PATENT DOCUMENTS

EP    1466772 A2    10/2004
EP    1496292 A1    1/2005
(Continued)

OTHER PUBLICATIONS

European Official Action (dated Jan. 28, 2019) for corresponding European App. EP 15 886 619.4.
(Continued)

*Primary Examiner* — Mary Cheung
(74) *Attorney, Agent, or Firm* — WRB-IP LLP

(57) ABSTRACT

A method for controlling gear shifting of a working machine includes determining a representation of a first total tractive force of the working machine for the entire set of drive units; initiating a procedure for redistributing the tractive force while maintaining the first total tractive force, including decreasing, at least partly towards a level suitable for shifting gear, the torque and tractive force of at least the first drive unit down, and increasing, in a compensational manner, the torque and tractive force of at least one of the other drive units not subject to gear shifting; monitoring, during the redistribution procedure, a representation of a second total tractive force of the working machine for the other drive units not subject to gear shifting, and, provided that the second total tractive force exceeds a threshold limit that forms a function of the first total tractive force: decreasing the torque and tractive force of at least the first drive unit down to the level suitable for shifting gear and performing gear shifting for at least the first drive unit.

19 Claims, 5 Drawing Sheets

(51) Int. Cl.
*B60W 10/10* (2012.01)
*B60K 23/08* (2006.01)
*B60K 7/00* (2006.01)
*B60W 10/08* (2006.01)
*B60W 30/19* (2012.01)
*E02F 9/20* (2006.01)
*B62D 12/00* (2006.01)
*E02F 9/22* (2006.01)

(52) U.S. Cl.
CPC .......... *B60W 10/04* (2013.01); *B60W 10/08* (2013.01); *B60W 10/10* (2013.01); *B60W 30/19* (2013.01); *E02F 9/207* (2013.01); *E02F 9/2079* (2013.01); *B60K 2007/0038* (2013.01); *B60K 2007/0092* (2013.01); *B60W 2300/17* (2013.01); *B60W 2510/083* (2013.01); *B60W 2520/10* (2013.01); *B60W 2520/26* (2013.01); *B60W 2520/30* (2013.01); *B60W 2520/403* (2013.01); *B60W 2520/406* (2013.01); *B60W 2710/083* (2013.01); *B60W 2710/1005* (2013.01); *B60W 2720/26* (2013.01); *B60W 2720/30* (2013.01); *B60W 2720/403* (2013.01); *B60W 2720/406* (2013.01); *B60Y 2200/412* (2013.01); *B60Y 2200/415* (2013.01); *B62D 12/00* (2013.01); *E02F 9/2253* (2013.01)

(58) Field of Classification Search
CPC ........ B60W 2520/10; B60W 2720/30; B60W 2520/26; B60W 2720/406; B60W 2720/26; B60W 2710/083; B60W 2520/403; B60W 2520/406; B60W 2520/30; B60W 2720/403; B60W 2300/17; B60W 2710/1005; E02F 9/207; E02F 9/2079; E02F 9/2253; B60K 7/0007; B60K 23/0808; B60K 2007/0038; B60K 2007/0092; B62D 12/00; B60Y 2200/415; B60Y 2200/412
See application file for complete search history.

(56) References Cited

U.S. PATENT DOCUMENTS

| | | | |
|---|---|---|---|
| 2001/0003109 A1 | 6/2001 | Tabata | |
| 2004/0200648 A1 | 10/2004 | Tarasinski et al. | |
| 2004/0216166 A1 | 10/2004 | Caporizzo et al. | |
| 2005/0060080 A1* | 3/2005 | Phillips | B60K 6/44 701/54 |
| 2007/0150150 A1* | 6/2007 | Dobele | F16H 3/12 701/51 |
| 2009/0221392 A1* | 9/2009 | Bruce | B60K 17/3462 475/205 |
| 2010/0198469 A1 | 8/2010 | Mair | |
| 2010/0256877 A1* | 10/2010 | Nakagawa | E02F 9/2246 701/50 |
| 2011/0010082 A1 | 1/2011 | Weiss et al. | |
| 2011/0130901 A1* | 6/2011 | Mori | B60K 6/445 701/22 |
| 2012/0004797 A1* | 1/2012 | Baino | B60K 6/48 701/22 |
| 2016/0082972 A1* | 3/2016 | Fairgrieve | B60W 10/06 701/84 |

FOREIGN PATENT DOCUMENTS

| | | |
|---|---|---|
| EP | 2152536 B1 | 2/2010 |
| GB | 2465777 A | 6/2010 |

OTHER PUBLICATIONS

International Search Report (dated Dec. 22, 2015) for corresponding International App. PCT/SE2015/050358.

\* cited by examiner

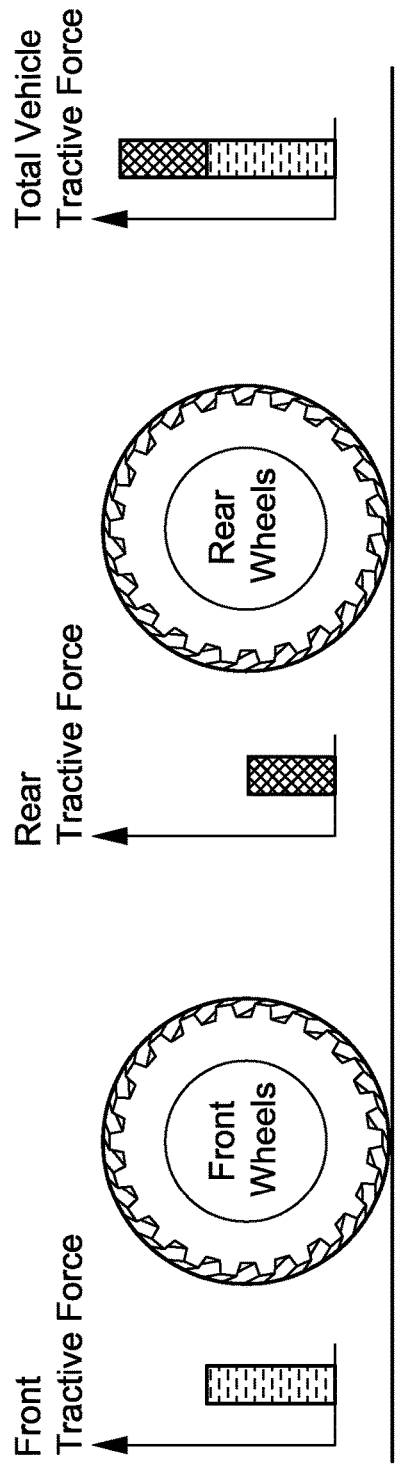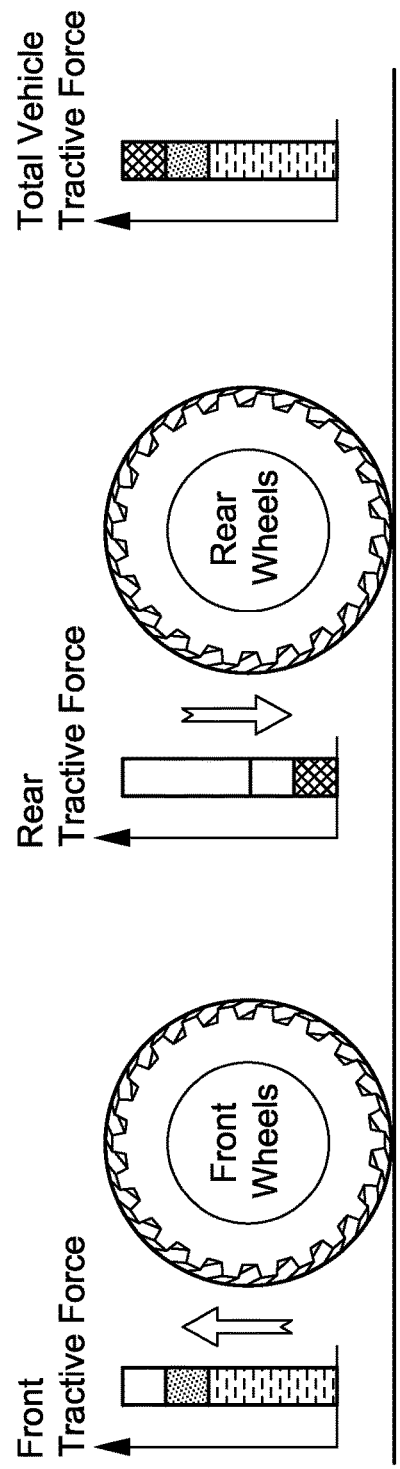

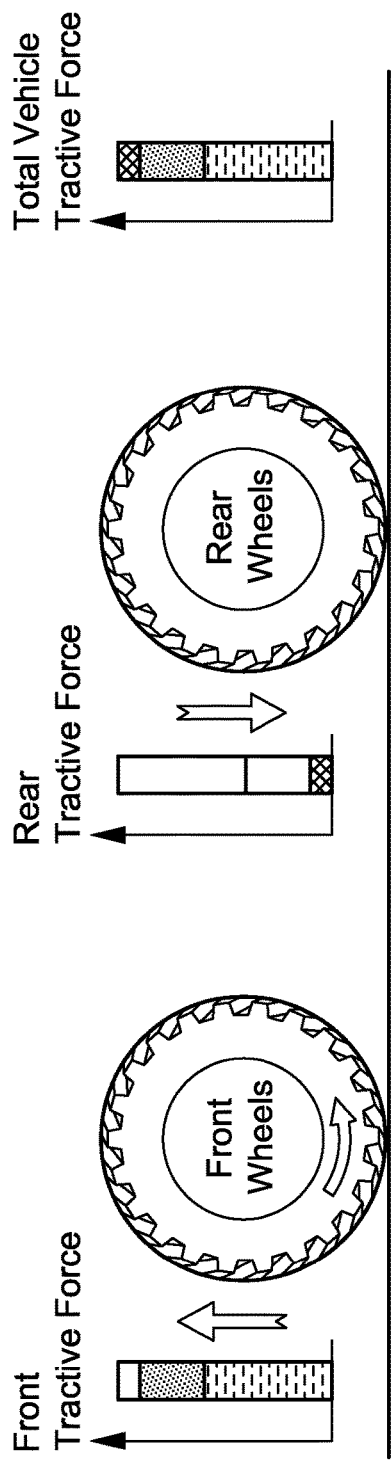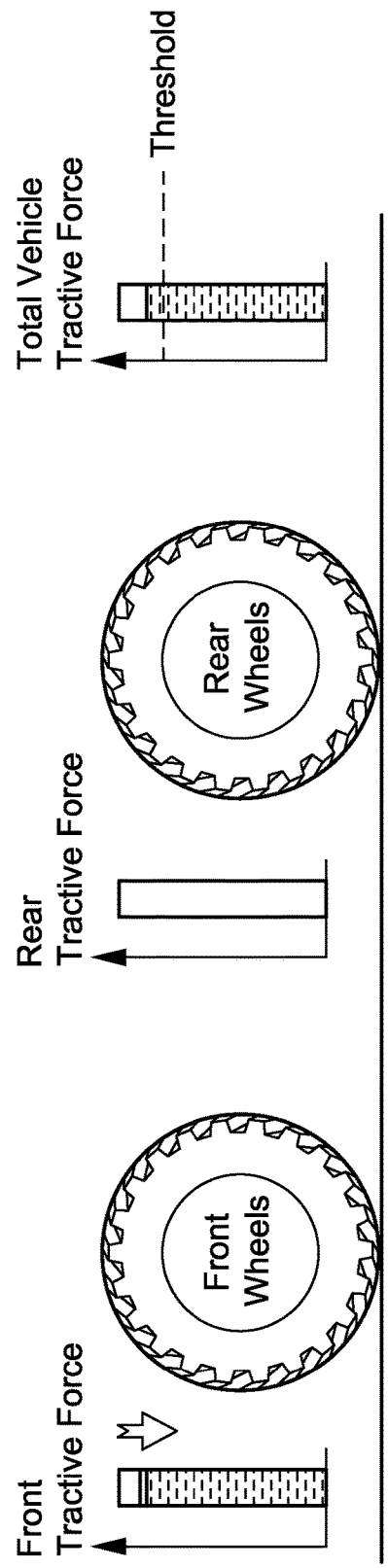

METHOD FOR CONTROLLING GEAR SHIFTING OF A WORKING MACHINE

BACKGROUND AND SUMMARY

This invention relates to a method for controlling gear shifting of a working machine provided with a set of independent drive units, such as an articulated, frame steered vehicle having four single-wheel electric hub motors.

A working machine, such as a front loader, wheel loader or an articulated hauler, is provided with a bucket, container or other type of implement for lifting, carrying and/or transporting a load. The drive system of such a working machine conventionally includes a single drive motor, such as a diesel engine, that drives all drive wheels via a single gearbox for matching the drive power to different driving conditions. The driveline may include a torque converter.

More recent working machines may include several independent drive units including, for instance, four drive wheels that are driven either axle-wise by two separate drive units, i.e. a front axle drives two front wheels and a rear axle drives two rear wheels, or via four separate drive units, i.e. single-wheel drive motors such as electric hub motors. Such drive systems normally include several gearboxes, one for each separate drive unit. Some working machines have more that four chive wheels.

Traditional gearboxes require that the torque applied is reduced to (close to) zero to make shifting of gear possible. If the torque applied to one of the drive units is significantly reduced to allow shifting of gear for that particular drive unit, the tractive force of the working machine is correspondingly reduced which in turn results in a drop in speed or acceleration. This is not only unpleasant for the driver but can have various negative effects, such as inducing safety risks, taking time/reducing efficiency and making it more problematic to advance upwards a steep slope.

US2004/0200648 addresses this problem and presents a solution including applying a greater load on a drive motor driving, say, the front axle while reducing the load on another drive motor driving the rear axle subject to gear shifting. After gear shifting, the load is redistributed to the original values.

However, the inventors have realized that significant speed drop can occur in some situations also with the solution proposed in US2004/0200648.

It is desirable to provide a method for controlling gear shifting of working machine that exhibit improved possibilities for changing gear without significant speed drop compared to conventional methods.

The invention concerns a method for controlling gear shifting of a working machine, wherein the working machine is provided with a set of drive units, each drive unit comprising at least one drive wheel and a drive motor capable of applying a torque to the drive wheel that results in a traction force of the drive wheel, and wherein at least a first drive unit comprises a gearbox providing at least two forward gears for the at least one drive wheel.

The invention is characterized in that the method comprises the steps of:

determining a representation of a first total tractive force of the working machine for the entire set of drive units, initiating a procedure for redistributing the tractive force while maintaining t to first total tractive force, comprising decreasing, at least partly down towards a level suitable for shifting gear, the, torque and tractive force of at least the first drive unit, and increasing, in a compensational manner, the torque and tractive force of at least one of the other drive units not subject to gear shifting, monitoring, during the redistribution procedure, a representation of a second total tractive force of the working machine for the other drive units not subject to gear shifting, and, provided that the second total tractive force exceeds a threshold limit forming a function of the first total tractive force, decreasing the torque and tractive force of at least the first drive unit down to the level suitable for shifting, gear and performing gear shifting for at least the first drive unit.

In short, this means that the available total traction force of the drive unit(s) not subject to gear shifting, i.e. the second total traction force, is checked while decreasing the torque and traction force down towards the very low level for the one or more drive units subject to gear shifting. It is thus checked whether the total tractive force actually can be maintained, at least to a certain degree, during the traction force/torque redistribution procedure.

In the inventive method the torque and tractive force of the drive unit(s) subject to gear shifting is not allowed to be reduced to the low level suitable for shifting gear, which in turn means that gear shifting is not allowed, if the available total traction force is not sufficient. This way it is possible to avoid gear shifting in situations where a conventional gear shifting procedure would lead to a significant drop in speed.

The higher the available total traction force for the drive units not subject to gear shifting, the lower the drop in vehicle speed (if any drop at all). The threshold limit may be set to, for instance, 80% or 90% of the first total tractive force, i.e, the total vehicle tractive force before the step of initiating the torque and tractive force redistribution procedure. This limit may, however, be varied depending on the situation.

The expression "a representation of a first/second total tractive force" means that it is not necessary to determine the actual tractive force. The tractive force for a drive wheel is given by the torque applied to the drive wheel divided by the radius of the drive wheel. The size of the drive wheels is usually known (or can easily be measured) and does not vary. However, the front drive wheels may be smaller than the rear drive wheels, or vice versa, and this might be relevant to consider during torque redistribution if the total tractive force is to be maintained, at least if the difference in wheel size is considerable.

An example of how to determine a representation of the traction force is therefore to determine the torque applied to a drive wheel. The torque, in turn, can for instance be obtained from the electric current fed to an electric drive motor, from a measured pressure of a hydraulic drive system, from calculations of the torque based on e.g. motor rotation speed of a hydrodynamic drive system with torque converter, or from engine data, e.g. amount of fuel injected, for a diesel combustion engine. Accordingly, the representation of the traction force can be determined by, for instance, determining the current fed to the electric drive motor, a parameter that typically is already "known" by the control unit of the working machine.

The total tractive force is an aggregate of the individual tractive forces of all drive wheels concerned.

The expression "the working machine is provided with a set of drive units, each drive unit comprising at least one drive wheel and a drive motor capable of applying a torque to the drive wheel that results in a traction force of the drive wheel" means, for instance, that the working machine has at least two separate, drive units, each of which driving one or more drive wheels. This includes, for instance, a working machine having a front axle driving two front wheels and a rear axle driving two rear wheels, or a working machine having four (or six) separate electric hub motors arranged in each of four (or six) separate drive wheels. It also includes combinations of driving axles and individual wheel motors.

The expression "at least a first drive unit comprises a gearbox providing at least two forward gears for the at least one drive wheel" means simply that at least one of the drive units comprises a gearbox of this type. In a general form of the invention it is sufficient that only one drive unit comprises a gearbox. In practice, each drive unit usually comprises a gearbox, and any of the gearboxes may provide more than two forward gears as well as one or more reverse gears.

In the step of "determining a representation of a first total tractive force of the working machine for the entire set of drive units", a representation of the current total traction force is determined from an aggregate of (a representation of) the individual, tractive forces of all drive wheels before starting the procedure of redistributing the torque/traction force. These individual tractive forces can be obtained from the torque applied by the drive motors that in turn can be obtained via e.g. the electric current fed to each of the motors, as described above. Each individual torque/electric current can be adjusted into a representation of an individual traction force by taking into account the number of drive wheels per drive motor and the size of the particular drive wheel. If all drive wheels have the same size and there is the same number of drive wheels per drive motor one can simply use the summed torque or electric current as the representation of the first total tractive force. For instance, if 20 A current is fed to each of two rear electric motors each of which driving one rear drive wheel, and 30 A current is fed to each of two front electric motors each of which driving one front drive wheel, the representation of the first total tractive force becomes 100 A.

In the step of "initiating a procedure for redistributing the tractive force . . . ", a step is started where the torque and tractive force of the drive unit(s) subject to gear shifting (i.e. at least the first drive unit) is decreased down towards, but not necessarily all the way down to, the low level suitable for shifting gear. Simultaneously, the torque and tractive force of the drive unit(s) not subject to gear shifting is increased in a compensational manner, with the intention to maintain the first total tractive force. For instance, if two rear drive wheels are subject to gear shifting, which rear wheels may have one common or two separate drive units, the torque and traction force can be (partly) reduced for the rear drive wheels and (partly) increased for two front drive wheels in such a way that the total tractive force remains constant. Adjustments may be made that take into account that the resulting change in tractive force as a response to a change in torque, may vary if the size of the drive wheels or the number of drive wheels per drive motor vary, in line with what is described above.

If adjustments for different wheel size or number of drive wheels per drive motor are not necessary, it is sufficient simply redistribute the torque or any representation of the torque, such as the electric current fed to electric drive motors. Following the example above, where 2×20 A electric current is fed to the rear drive wheels and 2×30 A is fed to the front drive wheels, the 40 A fed to the rear wheels is gradually redistributed to the front wheels so that after some time period the current fed to the rear wheels is 2×19 A and to the, front wheels 2×31 A, after a further time period 2×18 A and 2×32 A, respectively, etc.

During the tractive force redistribution procedure, a representation of a second total tractive force of the working machine is monitored for the other drive unit(s) not subject to gear shifting. It is thus monitored whether the drive units not subject to gear shifting actually can generate a sufficient total tractive force, i.e. the second total tractive force, on their own, without contribution from the drive unit(s) subject to gear shifting. This must be checked before the drive unit(s) subject to gear shifting reach(es) the low torque level suitable for gear shifting because at that level this/these drive unit(s) do(es) not contribute to the total tractive force.

This monitoring ran be done in a similar way as described for the step of determining the representation of the first total tractive force, i.e. by continuously or intermittently obtaining the torque, electric current etc. applied by the individual drive motors of the drive unit(s) not subject to gear shifting and summing this up properly to form the second total tractive force, optionally with adjustments for different drive wheel size etc.

If the second total tractive force is lower than the first total tractive force, the total tractive force is no longer maintained, which probably is due to wheel slip of one or more of the drive wheels of the drive unit(s) not subject to gear shifting. Checking whether the total tractive force is maintained can thus be done by comparing a determined representation of the second total tractive force with a corresponding determined representation of the first total tractive force. This checking can be done with a high frequency during the tractive force redistribution procedure.

Alternatively, or as a complement, monitoring the representation of the second total tractive force can be done by monitoring any wheel slip of the drive wheels forming part of the drive unit(s) not subject to gear shifting. As long as no wheel slip occurs, the total tractive force is maintained, which means that the second total tractive force has been indirectly determined to be the same as the first total tractive force. If wheel slip is detected, a representation of the second total tractive can be determined and compared with a corresponding determined representation of the first total tractive force as described above.

How to detect wheel slip is known as such. Usually, it can be obtained indirectly from the torque applied which, as mentioned above, often is already known by the control unit controlling the drive units of the working machine. A sudden change in torque may be an indication on wheel slip. Wheel slip may also be detected using wheel rotation sensors etc.

Preferably, wheel slip is continuously monitored, for instance via wheel rotation sensors. The torque applied to a certain drive wheel should be reduced if the wheel slips too much.

In a further step of the method, under the provision that the second total tractive force exceeds a threshold limit forming a function of the first total tractive force, the torque and tractive force of the drive unit(s) subject to gear shifting is decreased down to the level suitable for shifting gear followed by performing gear shifting for this/these drive unit(s) (i.e. at least the first drive unit).

The method can be repeated so as to shift gear for all drive units.

As mentioned above, the threshold limit can be set to for instance 80% or 90% of the first total traction force. Thus, a slight decrease in total tractive force may be accepted.

If the second total tractive force is below the threshold limit, shifting of gear is prevented to avoid a significant loss of traction force. As described in more detail below there are different ways to proceed from that point, for instance by repeating the torque redistribution procedure after some time period, by improving the distribution of the individual traction forces among the drive wheels of the drive units not subject to gear shifting to attain a higher second total tractive force, or by simply terminating the method.

In US2004/0200648 it is suggested to simply transfer the load or torque from the drive units subject to gear shifting to other drive units. But whether the increased load/torque of the other drive units really results in a correspondingly increased traction force is not addressed. A considerable drop in velocity may therefore occur in connection with shifting of gear.

Embodiments of the inventive method can include one or several of the following steps:

detecting, during the redistribution procedure, whether wheel slip occurs for at least one of the drive wheels of the at least one other drive unit not subject to gear shifting, determining a representation of an available individual traction force for the drive wheel subject to wheel slip based on the torque applied when wheel slip occurred, determining a representation of the second total tractive force of the working machine based in part on the available individual traction force for the drive wheel subject to wheel slip, and/or decreasing slightly the torque applied to the drive wheel subject to wheel slip so as to regain grip.

In case the second total tractive force does not exceed the threshold limit, the method can comprise the step of increasing the second total tractive force by increasing an individual traction force of a drive wheel that forms part of a drive unit not subject to gear shifting and that has not been subject to wheel slip. For instance, if one of two separately driven front wheels slips when the torque is increased for both front wheels, the torque and tractive force may be increased for the wheel that has not slipped (provided that the grip is better for this drive wheel).

As a complement or alternative in case the second total tractive force does not exceed the threshold limit, the method can comprise the step of increasing the second total tractive force by increasing the individual traction force of a second drive unit, wherein the second drive unit is subject to gear shifting together with the first drive unit during the tractive force redistribution procedure and wherein also at least the second drive unit comprises a gearbox providing at least two forward gears for the at least one drive wheel, This means that if its initially intended to e.g. shift gears simultaneously for both the first and the second drive units, for instance two single-wheel rear drive units, but it turns out during the redistribution procedure that the remaining drive units cannot generate a sufficient (second) tractive force, the initial intention is withdrawn or modified and instead the tractive force/torque for the second drive unit is increased back towards and perhaps beyond its original value so that it contributes to make the second total tractive force exceed the threshold limit. That way gear shifting can at least be performed for the first drive unit without a too large drop in speed. In a similar way, the first drive unit can, after gear shifting, be used to provide a sufficient second tractive force for shifting gear for the second unit.

In an embodiment of the method, it comprises the step of determining whether at least the first drive unit is operating within an operational interval in which gear shifting is suitable.

This involves providing an indication that the first drive unit, or any other drive unit, is approaching a point of operation at which gear shifting is necessary, typically that the working, machine is approaching a velocity at which gear shifting is necessary. This is typically a starting step of the method and means that the method can start some time before gear shifting is urgent. This way it is possible to allow time for the method to check the conditions for shifting as described above. The indication can be provided by e.g. a wheel rotation sensor that sends a signal to a control unit that controls the operation of the working machine, including the method for controlling gear shifting, regular torque distribution, etc.

In case the second total tractive force does not exceed the threshold limit, the method may comprise the steps of checking, after a certain time period, whether at least the first drive unit still is operating within an operational interval in which gear shifting is suitable, and, provided that gear shifting is still suitable, and repeating the method from the step of determining a representation of the first total tractive force of the working machine for the entire set of drive units, Thus, after a certain waiting time, perhaps around 1 second, it is checked whether shifting of gear is still suitable (which it may not be if the driver has requested a change in speed or acceleration), and if so the method is repeated. It may be that after the waiting time the grip is better for the drive wheels forming part of drive units not subject to gear shifting.

In case the second total tractive force does not exceed the threshold limit, the method can comprise the step of interrupting the tractive force redistribution procedure. Initially, the distribution of torque/tractive force can be kept at the current setting at the time of interruption while awaiting the method to proceed.

In an embodiment of the method it comprises the step of comparing the second total tractive force with the threshold limit.

The invention also concerns a computer program comprising program code means for performing the steps of the above method when said program is run on a computer.

The invention also concerns a computer readable medium carrying a computer program comprising program code means for performing the steps of the above method when said program product is run on a computer.

The invention also concerns a control unit for controlling gear shifting of a working machine provided with a set of drive units, each drive unit comprising at least one drive wheel and a drive motor capable of applying a torque to the drive wheel that results in a traction force of the drive wheel, and wherein at least a first drive unit comprises a gearbox providing at least two forward gears for the at least one drive wheel, the control unit being configured to perform the steps of:

determining a representation of a first total tractive force of the working machine for the entire set of drive units, initiating a procedure for redistributing the tractive force while maintaining the first total tractive force, comprising decreasing, at least partly down towards a level suitable for shifting gear, the torque and tractive force of at least the first drive unit, and increasing, in a compensational manner, the torque and tractive force of at least one of the other drive units not subject to gear shifting, monitoring, during the redistribution procedure, a representation of a second total tractive force of the working machine for the other drive units not subject to gear shifting, and, provided that the second total tractive force exceeds a threshold limit that forms a function of the first total tractive force:

decreasing the torque and tractive force of at least the first drive unit down to the level suitable for shifting gear and performing gear shifting for at least the first drive unit.

The control unit may also be configured to perform the step of monitoring, during the redistribution procedure, whether wheel slip occurs for at least one of the drive wheels of the at least one other drive unit not subject to gear shifting.

The control unit is preferably configured to control the regular torque distribution during operation of the working machine, to receive steering, speed and acceleration commands etc. from a driver, to receive data from wheel rotation sensors, torque sensors, drive motors etc. and to send out torque and power requests etc. to the drive motors.

The invention also concerns a working machine having a set of drive units, each drive unit comprising at least one drive wheel and a drive motor capable of applying a torque to the drive wheel that results in traction force of the drive wheel, and wherein at least a first drive unit comprises a gearbox providing at least two forward gears for the at least one drive wheel, wherein the working machine comprises a control unit of the above type.

The invention concerns in particular a working machine comprising at least four drive units, wherein each of said four drive units comprises a single drive wheel driven by an individual drive motor. The individual drive motors are preferably electric hub motors. The invention concerns in particular also a working machine of the type being an articulated, frame steered vehicle having a front frame and a rear frame connected via an arrangement allowing the frames to pivot relative to each other about a vertical axis.

BRIEF DESCRIPTION OF DRAWINGS

In the description e f the invention given below reference is made to the following figure, in which:

FIGS. 3a-3d show an example of the method applied to a working machine with two drive units, a front and a rear drive axle.

DETAILED DESCRIPTION

Figure 1:
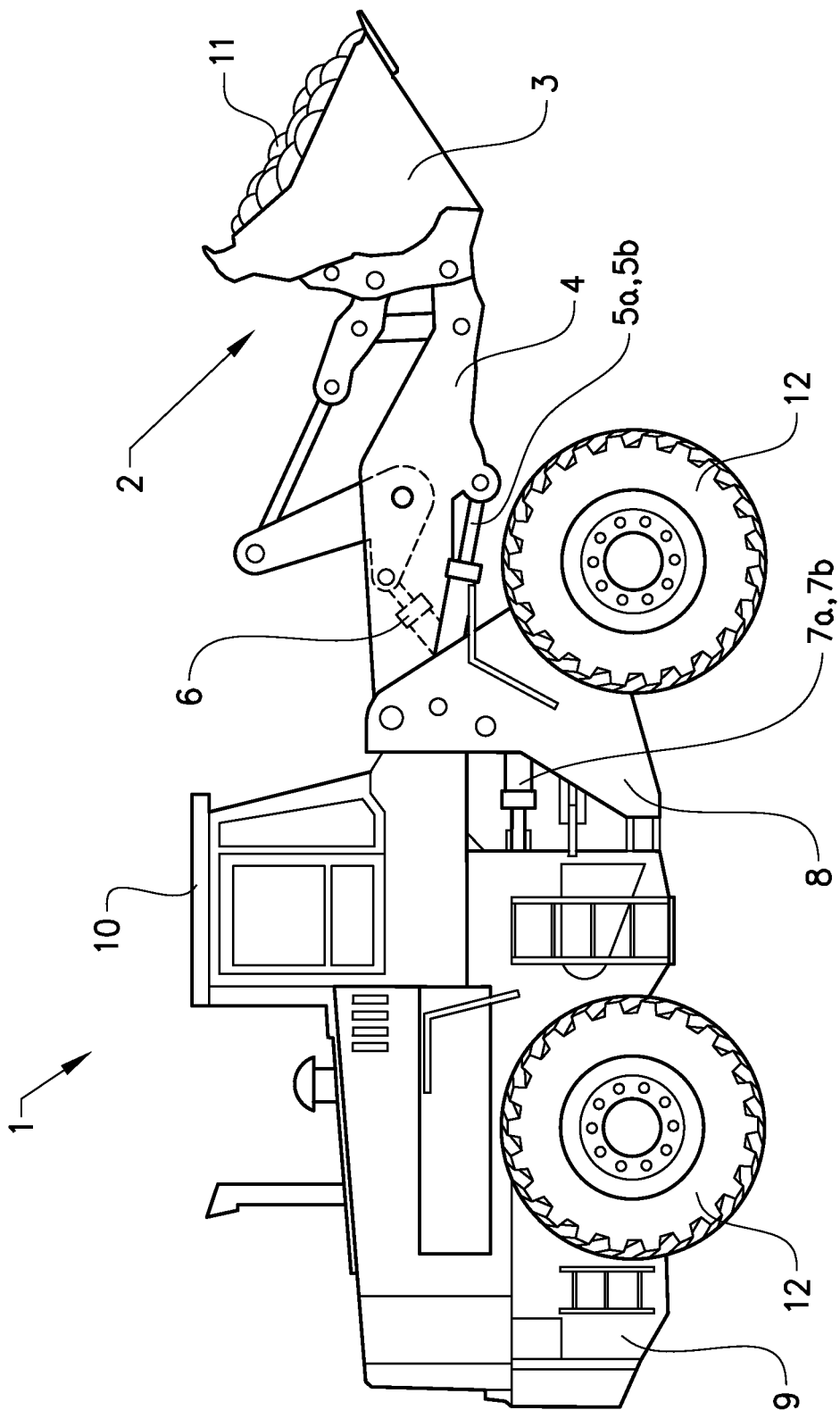
FIG. 1 shows an example of a working machine.

FIG. 1 shows a working machine 1 in the form of a wheel loader. The wheel loader 1 is to be considered as an example of a working machine having a drive system to which the method according to the invention can be applied.

The wheel loader 1 has a forward machine part/front frame 8 and a rear machine part/rear frame 9. Each of the machine parts/frames comprises two drive wheels 12. The rear machine part 9 comprises a cab 10 for an operator of the wheel loader 1. The machine parts 8, 9 are connected to each other in such a way that they can pivot relative to each other about a vertical axis by means of two hydraulic cylinders (steering cylinders) 7a, 7b which are arranged between the machine parts 8, 9 and attached thereto. The hydraulic cylinders 7a, 7b are thus arranged one on each side of a centre line extending in the longitudinal direction of the working machine 1 in order to turn or steer the wheel loader by means of the hydraulic cylinders. In other words, the wheel loader 1 is a so called frame-steered working machine.

The wheel loader 1 comprises a load arm assembly 2 for handling different loads, such as objects or material. The load arm assembly 2 comprises a lift arm unit 4 and an implement 3 in the shape of a bucket which is mounted on the lift arm unit. In the illustrated example the bucket 3 is filled with material 11. A first end of the load arm unit 4 is pivotally connected to the forward machine part 8 in order to achieve a lift motion of the bucket 3. The bucket 3 is pivotally connected to a second end of the lift arm unit 4 in order to achieve a tilt motion of the bucket. The lift arm unit 4 can be raised and lowered relative to the forward machine part 8 of the vehicle by means of two hydraulic cylinders (lift cylinders) 5a, 5b. Each of the hydraulic cylinders is at a first end thereof coupled to the forward machine part 8 and at the second end thereof to the lift arm unit 4. The bucket 3 can be tilted relative to the lift arm unit 4 by means of a further hydraulic cylinder (tilt cylinder) 6, which at a first end thereof is coupled to the forward machine part 8 and at the second end thereof is coupled to the bucket 3 via a link arm system, The wheel loader 1 comprises also a drive system (not illustrated) which includes at least two drive units, each of which including a drive motor, a gear box and at least one drive wheel 12. The drive units can be driven independently of each other, i.e. the torque applied by one drive unit can be varied independently of the torque applied by another drive unit.

The wheel loader is further provided with a control unit that controls the operation of the machine, including e.g. the control of the distribution of the torque between the drive units. The control unit can be configured to control all variants of the inventive method.

In an example, a first drive unit includes both the drive wheels 12 arranged on the rear frame 9, which wheels are connected to a common rear drive axle. In the same example, a second drive unit includes both the drive wheels 12 arranged on the front frame 8, which wheels are connected to a common front drive axle. In another example, the drive system comprises four drive units, each forming a single-wheel drive unit including an electric or hydraulic hub motor arranged in each of the four drive wheels 12.

Figure 2:
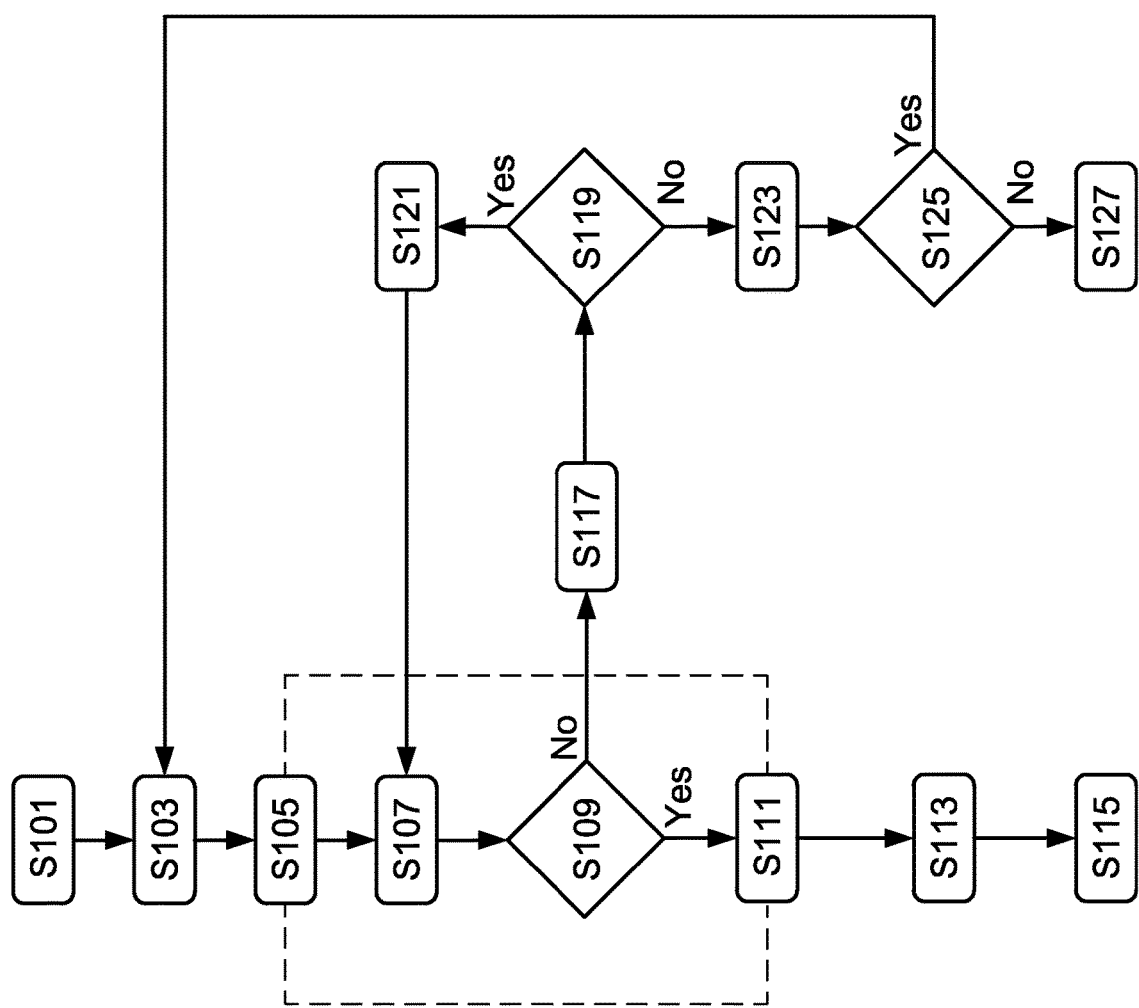
FIG. 2 shows a flowchart of an embodiment of the inventive method.

FIG. 2 shows a flowchart of an embodiment of the inventive method. The steps can described as follows:

S101: determining whether one or more of the drive units is operating within an operational interval in which gear shifting is suitable.

A command signal for starting the method can be trigged by a certain vehicle velocity or certain wheel rotation speed forming a lower or upper limit of the operational interval. The signal should be trigged some time before it becomes immediately necessary to shift gears to allow time for a proper gear shifting process. The operational interval can be made dependent on the acceleration, for instance, the starting signal can be triggered at a somewhat lower vehicle velocity at a higher (increasing) acceleration than at a lower acceleration.

S103; determining a representation of a first total tractive force of the working machine for the entire set of drive units.

As mentioned above, the representation of the first total tractive force can be the total torque applied by the drive units, or, where the drive units include only electric drive motors, the total electric current fed to the electric drive motors.

S105: initiating a procedure for redistributing the tractive force while maintaining the first total tractive force, comprising decreasing the torque and tractive force of at least the first drive unit down towards a level suitable for shifting gear, and increasing, in a compensational manner, the torque and tractive force of at least one of the other drive units not subject to gear shifting.

It has thus been determined that at least one of the drive units, the first drive unit, is operating within an operational interval in which gear shifting is suitable, and this at least one drive unit has been selected to be subject to gear shifting. The "first" drive unit can be any of the drive units. More than one drive unit can be selected to be subject to gear shifting, for instance, both rear drive wheels 12 of the working machine 1 described above in the example where all drive wheels forms part of an individual drive unit.

The traction force redistribution procedure continues during steps 107 and 109 if not interrupted. This is indicated by the dashed lines in FIG. 2.

S107: monitoring, during the redistribution procedure, a representation of a second total tractive force of the working machine for the other drive units not subject to gear shifting.

As mentioned above, this can be done by monitoring any wheel slip of the drive wheels forming part of the drive units not subject to gear shifting, for instance, by monitoring the wheel slip of the front wheels if the rear wheels form part of (a) drive unit(s) subject to gear shifting. If no wheel slip occurs, the total vehicle traction force has not changed. If wheel slip occurs, the representation of the second total tractive force is calculated at the torque (or electric current) applied when wheel slip occurs (or slightly below that torque to provide for a more secure grip).

S109: in this step it is determined whether the second total tractive force exceeds a threshold limit that forms a function of the first total tractive force.

Typically, a value representing the second total tractive force is compared with the threshold limit. For instance, the threshold limit can be 80% of a value representing the first total tractive force.

If the answer to the question in S109 is Yes:

S111: decreasing the torque and tractive force of at least the first drive unit down to the level suitable for shifting gear and S113: performing gear shifting for at least the first drive unit.

Accordingly, S111 and S113 are performed when the second total tractive force is sufficient. This is, for instance, the case when no wheel slip occurs during the redistribution procedure or when sufficient additional tractive force can be added (see below). Gears can be shifted simultaneously on more than one drive unit. Such simultaneous gear shifting does not necessarily have to be performed in parallel, e.g. for both rear drive units/wheels, but can be performed diagonally, e.g. left front drive unit/wheel and right rear drive unit/wheel, if that is more suitable.

After gear shifting the tractive force/torque can be redistributed again back to its original values.

S115 can be a terminating step of the method. The method can be repeated to carry out gear shifting for other drive units. The repetition may be carried out before terminating the method.

If the answer to the question in S109 is No:

S117: interrupting the tractive force redistribution procedure.

Typically, S117 is run when wheel slip is detected, and this step may include reducing slightly the torque applied to the wheel subject to wheel slip so as to regain grip. The individual tractive force/torque attained after having performed part of the redistribution procedure can be kept.

S119: in this step it is determined whether the second total traction force can be increased by one or both of the following steps:

A) increasing an individual traction force of a drive wheel that forms part of a drive unit not subject to gear shifting and that has not been subject to wheel slip, and/or B) increasing the individual traction force of a second drive unit that initially was subject to gear shifting together with the first drive unit during the tractive force redistribution procedure.

An example of when step A is applicable is when the drive unit(s) driving the rear drive wheels is/are subject to gear shifting and the front drive wheels have separate drive units. If, when the tractive force is reduced for the rear drive wheels and increased for the front drive wheels during the redistribution procedure, one of the front wheels slip while the other does not, it may be that the tractive force can be increased for the front drive wheel not subject to wheel slip in a manner sufficient for increasing the second total tractive force above the threshold.

An example of when step B is applicable is when a first and second drive unit driving each of two rear drive wheels are both initially subject to gear shifting, i.e. the intention from the beginning is to shift gears for both the first and the second drive unit simultaneously. If when the tractive force is reduced for the rear drive wheels and increased for the front drive wheels during the redistribution procedure, it turns out that the tractive force of the front drive wheels is not sufficient, gear shifting for the second drive unit (i.e. for any of the drive units initially subject to gear shifting) can be cancelled and instead the tractive force can be increased for the second drive unit so that it adds to the tractive force of the front drive wheels and thereby makes the second total tractive force to exceed the threshold.

If the answer to the question in S119 is Yes:

S121: increasing the second total tractive force, via steps A and/or B and continue the tractive force redistribution procedure from S107.

If the answer to the question in S119 is No:

S123: allowing a certain time period to pass, and

S125: checking whether at least the first drive unit (i.e. the drive unit subject to gear shifting) still is operating within an operational interval in which gear shifting is suitable.

The time period allowed to pass may be around 0.5-1 second.

Provided that gear shifting is still suitable after the waiting period, the method is repeated from the step of determining a representation of the first total tractive force of the working machine for the entire set of drive units (S103). It may be that the drive wheels have better grip after the waiting period and that gear shifting at that point of time can be performed without significant drop in speed.

If gear shifting is not suitable after the waiting period, it may for instance be that the driver may have sent a command to the control unit to lower the speed during the waiting period, the method is interrupted. The method may be run again from start without any significant delay. As an alternative to re-running the method, it may be decided (by another process run by the control unit) to change gear anyway, i.e. the drop in speed during gear shifting must simply be accepted. This could be the case if the speed of the working machine has reached a certain level.

FIGS. 3*a*-3*d* exemplifies a case where the working machine has two drive units, a front drive unit driving two front drive wheels and a rear drive unit driving two rear drive wheels. The left column shows the tractive force exerted by the two front drive wheels, the middle column shows the tractive force exerted by the two rear drive wheels, and the right column shows the total traction force.

FIG. 3a shows the situation when it is determined that the rear drive unit (the rear drive wheels) is operating within an operational interval in which gear shifting is suitable (S101). The rear drive unit is thus subject to gear shifting.

A representation of a first total tractive force of the working machine for the entire set of drive units is now determined (S103). In this example no absolute values are used, instead it can simply be said that the first total tractive force is 100%. As shown in FIG. 3a, the front drive unit (the front wheels) contribute to around 60% of the total traction force and the rear drive unit (the rear wheels) the remaining 40%.

In FIG. 3b the procedure for redistributing the tractive force has been initiated (S105). The torque and tractive force of the rear drive unit has been decreased down to around 20% of the total tractive force and the torque and tractive force of the front drive unit has been increased by a corresponding amount so as to maintain the first total tractive force at 100%. The torque and tractive force of the rear drive unit has not yet reached the low level suitable for shifting gear.

Monitoring of any wheel slip of the front drive wheels, i.e. the wheels forming part of the drive unit not subject to near shifting, is carried out during the redistribution procedure (S107). In FIG. 3b, no wheel slip has yet occurred.

FIG. 3c shows the situation somewhat later when the torque/traction force of the front wheels has reached around 90% and the rear wheels around 10% of the first total tractive force. At this stage wheel slip is detected for the front wheels (indicated by an arrow on the front wheel).

FIG. 3d the torque/traction force has been reduced slightly for the front drive unit/wheels so as to regain a secure grip. The torque/traction force of the front wheels is then slightly below 90%, say 88%, of the first total vehicle traction force.

FIG. 3d also illustrates the steps of determining a representation of a second total tractive force for the drive units not subject to gear shifting (S107), i.e. the front drive unit in this example, and determining whether the second total tractive force exceeds a threshold limit that forms a function of the first total tractive force (S109).

In the right column of FIG. 3d the 88% traction force of the front drive unit/drive wheels is compared with a threshold limit which in this example is set to 80% of the first total tractive force. Because 88% is more than 80%, gear shifting is allowed and the torque and tractive force of the rear drive unit/drive wheels can be decreased down to the level suitable for shifting gear (S111), which in this case is zero as illustrated in the middle column in FIG. 3d.

Gear shifting can now be performed for the rear drive unit (S113). After gear shifting the tractive force/torque can be redistributed again back to its original values. The method can be repeated to carry out gear shifting also for the front drive unit.

FIGS. 4a-4d shows an example where the working machine is provided with four single-wheel drive units driving two front wheels and two rear wheels, all of the same size. Further, all drive motors are of the electric type where the representation of the traction force is given by the electric current fed to the electric drive motor.

Figure 4B:
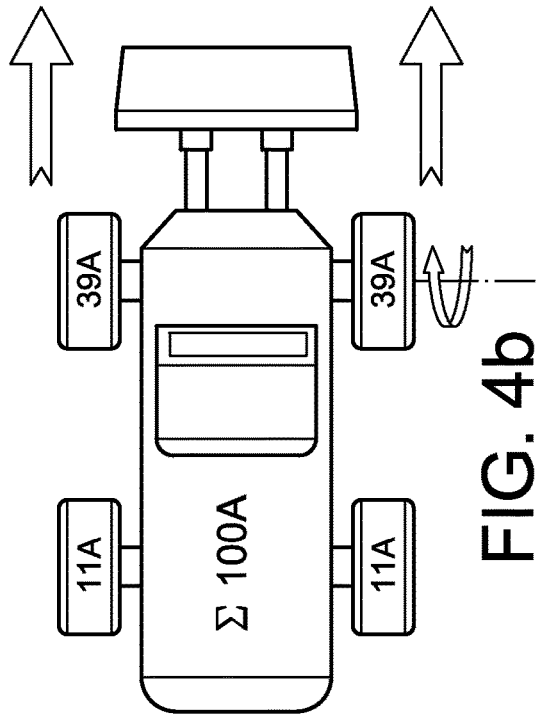
FIGS. 4a-4d show an example of the method applied to a working machine with four single-wheel drive units driving two front wheels and two rear wheels.
Figure 4D:
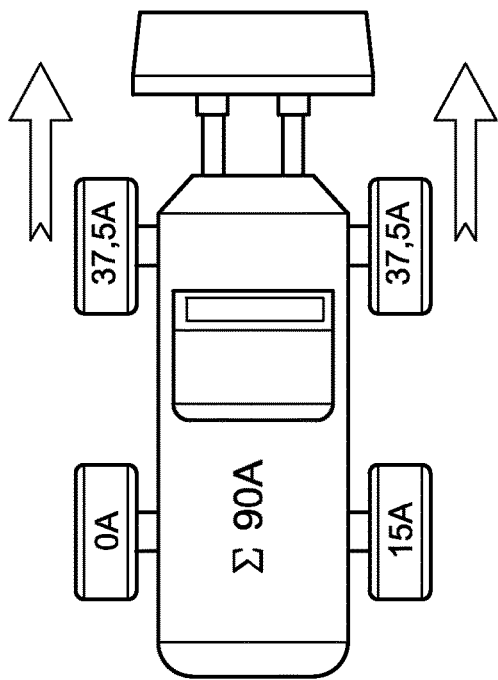
Figure 4A:
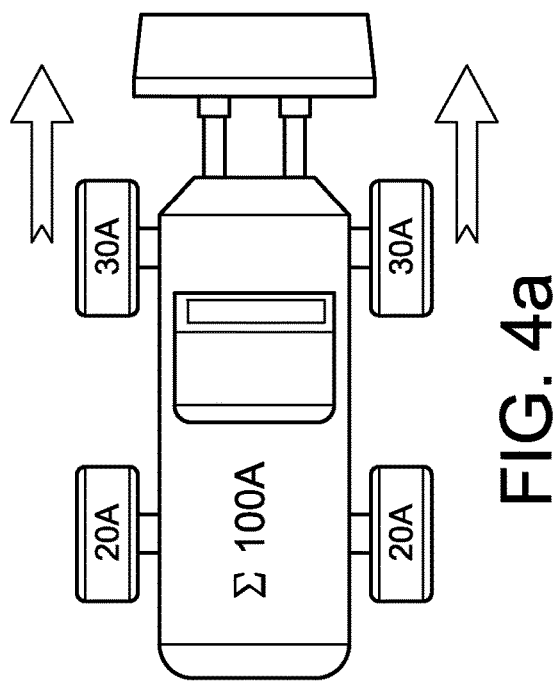

FIG. 4a shows the starting point where 30 A is fed to each of the front drive units and 20 A to each of the rear drive units adding up to a total of 100 A, which thus forms the representation of the first total tractive force of the working machine for the entire set of drive units.

In this example it has been determined that gear shifting for both rear drive units is suitable; both rear drive units are thus initially subject to gear shifting.

The threshold limit for the second total tractive force is in this example set to 85% of the first total tractive force. The threshold limit is thus 85 A.

FIG. 4b shows the situation when the redistribution procedure has proceeded for some time so that the current of each of the front drive units has been increased to 39 A and so that the current of each of the rear drive units is 11 A, still adding up to 100 A. At this stage wheel slip is detected for the right front drive wheel.

Because the total tractive force of the two front drive units is not sufficient, 39 A+39 A=78 A which is less than the threshold limit of 85 A, gear shifting cannot be carried simultaneously for the two rear drive units (without an unacceptable drop in speed).

Figure 4C:
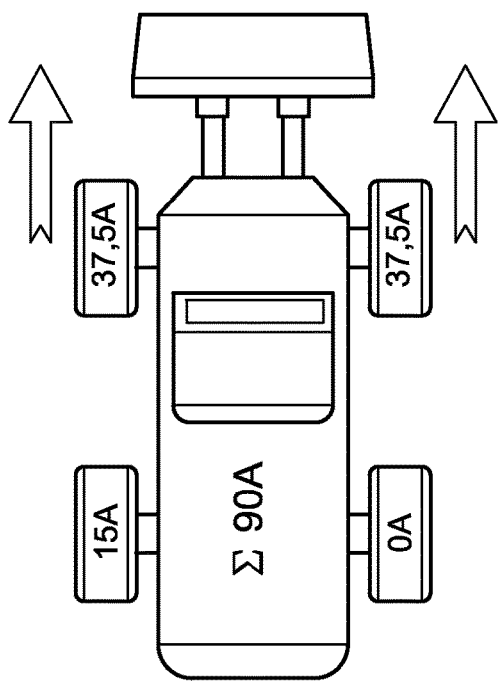

FIG. 4c shows that the current for the front drive units has been lowered to 37.5 A to regain a secure grip. As to the rear drive units, the attempt to carry out simultaneous shifting of gears has been cancelled, instead the left rear drive unit has been given 15 A to add to the second total tractive force, whereas the electric current (torque, tractive force) of the right rear drive unit has been reduced to zero to make gear shifting possible for that unit. The total tractive force is in this situation 37.5 A+37.5 A+15 A=90 A, which is above the threshold of 85 A.

This is an example of step S119 (see above). As an alternative, or complement, to let one of the rear drive units add to the total traction force during gear shifting, it is possible in this example to (try to) increase the tractive force of the left front drive wheel, where wheel slip has not occurred (yet), by increasing the current fed to the left front drive unit. It could be that the grip is better on the left side of the working machine and possibly the current fed to the left front drive unit could be increased to 48 A without wheel slip, which would allow gear shifting for both rear drive units simultaneously as 37.5 A+48 A=85.5 A which is above the threshold.

After gear shifting for the left rear drive unit, gear shifting for the right rear drive unit can be performed by a current/torque/tractive force redistribution procedure between the rear drive units so that the current fed to the left rear is raised to 15 A and that fed to the right rear drive unit lowered to zero. This is illustrated in FIG. 4d.

The invention is not limited by the embodiments described above but can be modified in various ways within the scope of the claims.

The invention claimed is:

1. Method for controlling gear shifting of a working machine, wherein the working machine is provided with a set of drive units, each drive unit comprising at least one drive wheel and a drive motor capable of applying a torque to the drive wheel that results in a traction force of the drive wheel, and wherein at least a first drive unit comprises a gearbox providing at least two forward gears for the at least one drive wheel, the method comprising:
  determining a representation of a first total tractive force of the working machine for the entire set of drive units,
  initiating a procedure for redistributing the tractive force while maintaining the first total tractive force, comprising decreasing, at least partly down towards a level suitable for shifting gear, the torque and tractive force of at least the first drive unit, and increasing, in a compensational manner, the torque and tractive force of at least one of the other drive units not subject to gear shifting, monitoring, during the redistribution procedure, a representation of a second total tractive force of the working machine for the other drive units not subject to gear shifting, and, provided that the second total tractive force exceeds a threshold limit that forms a function of the first total tractive force:

decreasing the torque and tractive force of at least the first drive unit down to the level suitable for shifting gear and performing gear shifting for at least the first drive unit.

2. Method according to claim 1, wherein the step of monitoring the representation of the second total tractive force comprises:

detecting, during the redistribution procedure, whether wheel slip occurs for at least one of the drive wheels of the at least one other drive unit not subject to gear shifting.

3. Method according to claim 2, comprising, provided that wheel slip is detected determining a representation of an available individual traction force for the drive wheel subject to wheel slip based on the torque applied when wheel slip occurred.

4. Method according to claim 3, comprising, provided that wheel slip is detected determining a representation of the second total tractive force of the working machine based in part on the available individual traction force for the drive wheel subject to wheel slip.

5. Method according to claim 2, comprising decreasing slightly the torque applied to the drive wheel subject to wheel slip so as to regain grip.

6. Method according to claim 2, wherein the second total tractive force does not exceed the threshold limit, the method comprising:

increasing the second total tractive force by increasing an individual traction force of a drive wheel that forms part of a drive unit not subject to gear shifting and that has not been subject to wheel slip.

7. Method according to claim 1, wherein also at least a second drive unit comprises a gearbox providing at least two forward gears for the at least one drive wheel, wherein the second drive unit is subject to gear shifting together with the first drive unit during the tractive force redistribution procedure, and wherein the second total tractive force does not exceed the threshold limit, the method comprising:

increasing the second total tractive force by increasing the individual traction force of the second drive unit.

8. Method according to claim 1, the method comprising:

determining whether at least the first drive unit is operating within an operational interval in which gear shifting is suitable.

9. Method according to claim 8, wherein the second total tractive force does not exceed the threshold limit, the method comprising:

checking, after a certain time period, whether at least the first drive unit still is operating within an operational interval in which gear shifting is suitable, and, provided that gear shifting is still suitable, repeating the method from the step of determining a representation of the first total tractive force of the working machine for the entire set of drive units.

10. Method according to claim 1, wherein the second total tractive force does not exceed the threshold limit, the method comprising:

interrupting the tractive force redistribution procedure.

11. Method according to claim 1, the method comprising comparing the second total tractive force with the threshold limit.

12. A control unit for controlling gear shifting of a working machine provided with a set of drive units, each drive unit comprising at least one drive wheel and a drive motor capable of applying a torque to the drive wheel that results in a traction force of the drive wheel, and wherein at least a first drive unit comprises a gearbox providing at least two forward gears for the at least one drive wheel, the control unit being configured to perform the steps of:

determining a representation of a first total tractive force of the working machine for the entire set of drive units, initiating a procedure for redistributing the tractive force while maintaining the first total tractive force, comprising decreasing, at least partly down towards a level suitable for shifting gear, the torque and tractive force of at least the first drive unit, and increasing, in a compensational manner, the torque and tractive force of at least one of the other drive units not subject to gear shifting, monitoring, during the redistribution procedure, a representation of a second total tractive force of the working machine for the other drive units not subject to gear shifting, and, provided that the second total tractive force exceeds a threshold limit that forms a function of the first total tractive force:

decreasing the torque and tractive force of at least the first drive unit down to the level suitable for shifting gear and performing gear shifting for at least the first drive unit.

13. A control unit according to claim 12, wherein the control unit is configured to perform the step of monitoring, during the redistribution procedure, whether wheel slip occurs for at least one of the drive wheels of the at least one other drive unit not subject to gear shifting.

14. Working machine having a set of drive units, each drive unit comprising at least one drive wheel and a drive motor capable of applying a torque to the drive wheel that results in a traction force of the drive wheel, and wherein at least a first drive unit comprises a gearbox providing at least two forward gears for the at least one drive wheel, wherein the working machine comprises a control unit for controlling gear shifting of the working machine, the control unit being configured to perform the steps of:

determining a representation of a first total tractive force of the working machine for the entire set of drive units, initiating a procedure for redistributing the tractive force while maintaining the first total tractive force, comprising decreasing, at least partly down towards a level suitable for shifting gear, the torque and tractive force of at least the first drive unit, and increasing, in a compensational manner, the torque and tractive force of at least one of the other drive units not subject to gear shifting, monitoring, during the redistribution procedure, a representation of a second total tractive force of the working machine for the other drive units not subject to gear shifting, and, provided that the second total tractive force exceeds a threshold limit that forms a function of the first total tractive force:

decreasing the torque and tractive force of at least the first drive unit down to the level suitable for shifting gear and performing gear shifting for at least the first drive unit.

15. Working machine according to claim 14, wherein each of the drive units comprises either a pair of drive wheels driven by a common axle or a single drive wheel driven by an individual drive motor.

16. Working machine according to claim 15, wherein the working machine comprises at least four drive units, wherein each of the four drive units comprises a single drive wheel driven by an individual drive motor.

17. Working machine according to claim 16, wherein the individual drive motors are electric hub motors.

18. Working machine according to claim 15, wherein the working machine is an articulated, frame steered vehicle having a front frame and a rear frame connected via an arrangement allowing the frames to pivot relative to each other about a vertical axis.

19. Working machine according to claim 14, wherein the working machine is a wheel loader.

\* \* \* \* \*